W. G. HARTWIG.
MECHANICAL OPERATING CONNECTION.
APPLICATION FILED JULY 9, 1917.

1,412,283.

Patented Apr. 11, 1922.
2 SHEETS—SHEET 1.

Inventor
William G. Hartwig

W. G. HARTWIG.
MECHANICAL OPERATING CONNECTION.
APPLICATION FILED JULY 9, 1917.
1,412,283. Patented Apr. 11, 1922.
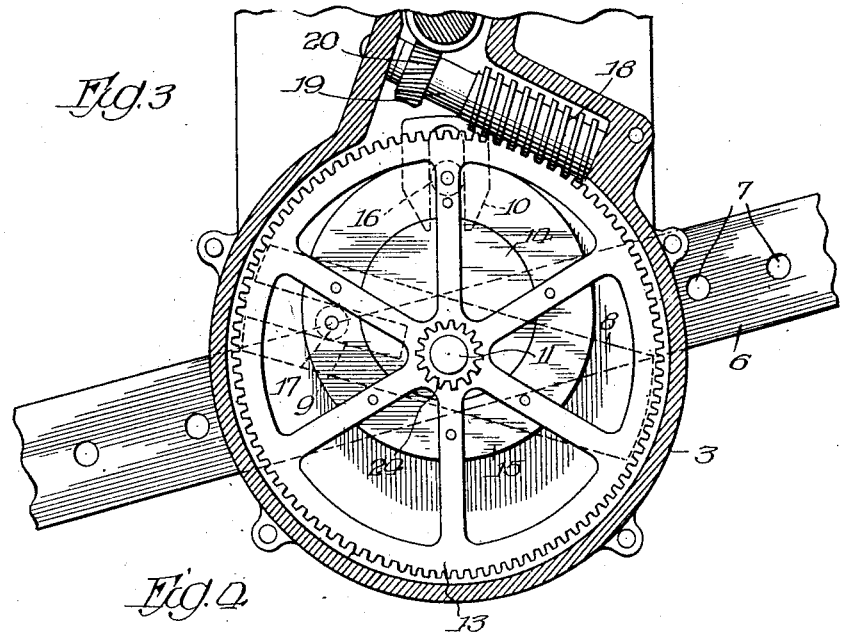
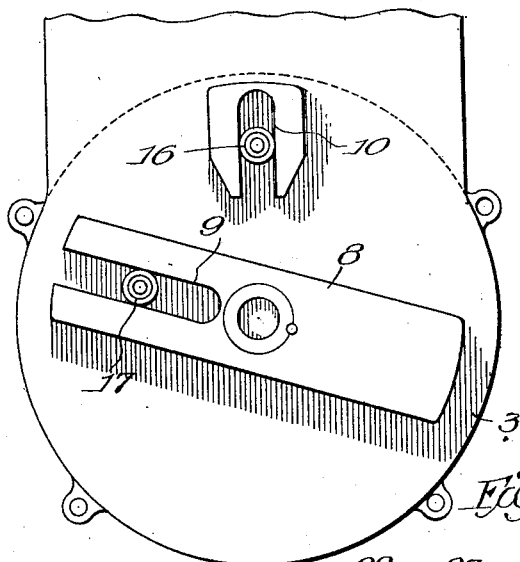
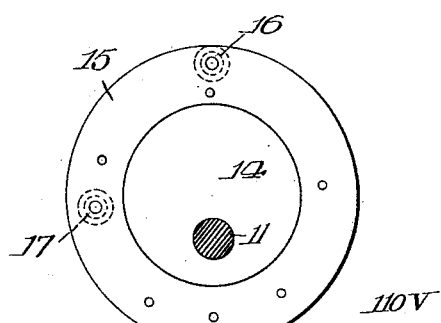

UNITED STATES PATENT OFFICE.

WILLIAM GEORGE HARTWIG, OF CHICAGO, ILLINOIS, ASSIGNOR TO ARTHUR FRANTZEN, OF CHICAGO, ILLINOIS.

MECHANICAL OPERATING CONNECTION.

1,412,283.   Specification of Letters Patent.   Patented Apr. 11, 1922.

Application filed July 9, 1917. Serial No. 179,359.

*To all whom it may concern:*

Be it known that I, WILLIAM G. HARTWIG, a citizen of the United States of America, and resident of Chicago, Cook County, Illinois, have invented a certain new and useful Improvement in Mechanical Operating Connections, of which the following is a specification.

This invention relates to automatic regulators in general, but more particularly to those which are operated electrically, and especially those which are employed for automatically controlling heating systems of various kinds, so that the room where the thermostat is located will be maintained at the desired temperature.

Generally stated, the object of this invention is to provide a novel and improved mechanism for converting the rotary motion of the power-transmitting connection into an oscillatory motion, so that the means to be controlled, such for example as the dampers of a heating furnace, or any other device, will be operated in the required manner.

It is also an object to provide certain details and features of construction and combinations tending to increase the general efficiency and desirability of a mechanical operating connection of this particular character.

To the foregoing and other useful ends, my invention consists in matters hereinafter set forth and claimed.

In the accompanying drawings:—

Fig. 3 is an enlarged transverse section on line 3—3 in Fig. 2.

Fig. 4 shows the mechanism of Fig. 3 with certain portions thereof removed to bring other parts into view.

Fig. 5 is a detail view of the eccentric strap involved in the construction of said mechanical operating connection.

Fig. 6 is a diagram showing the circuits that may be employed for controlling the electric motor by which the mechanical operating connection is operated.

Figure 1:
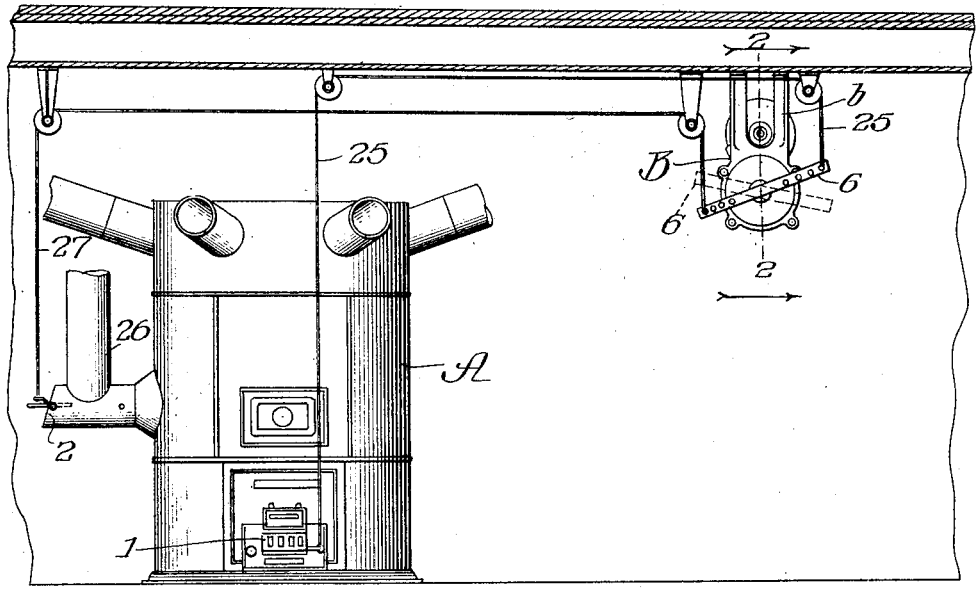
Fig. 1 is a front elevation of a heating furnace equipped with a furnace regulator having a mechanical operating connection embodying the principles of my invention.
Figure 2:
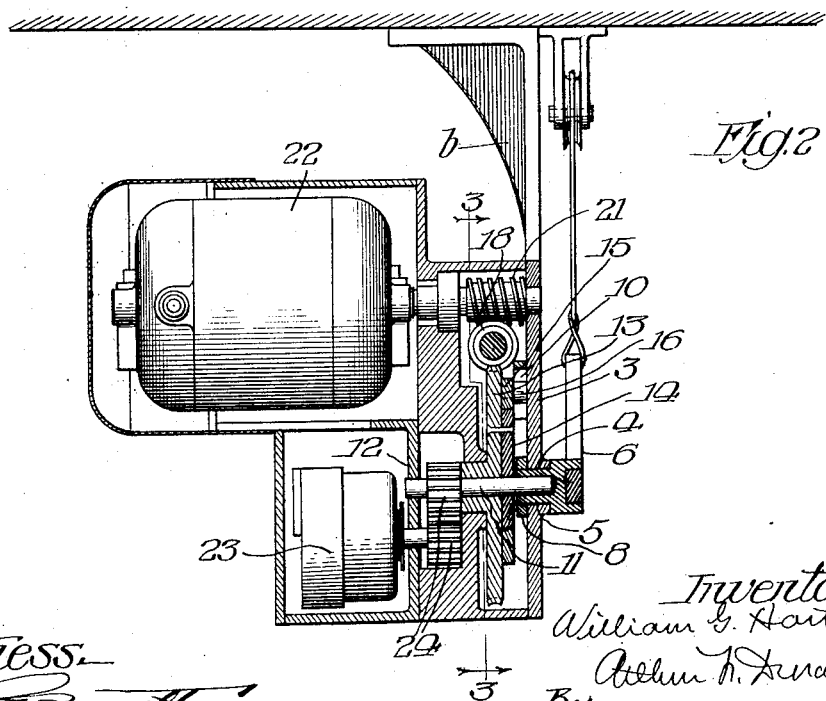
Fig. 2 is an enlarged vertical section on line 2—2 in Fig. 1.

As thus illustrated, the heating furnace A may be of any suitable, known or approved form, and has a lower damper 1 for admitting air below the fire, and a rear intake or cold air duct 2 which is open when the damper is closed and, vice versa, closed when the damper is open. The motor-operated regulator B comprises a bracket *b* which is suitably fastened to the ceiling, or to any overhead support, and which is rigid with the plate 3 of the casing of said regulator. This plate has a bearing 4 in which the sleeve 5 is mounted to oscillate, this sleeve having its outer end provided with a transverse bar 6 having holes 7 therein. The inner end of the sleeve 5 is rigid with the transverse guide 8 which has a longitudinal slot 9, and above this oscillatory guide the plate 3 has a stationary guide 10 which extends vertically. A rotary pin 11 rotates in the sleeve 5 and extends into a bearing 12 in another portion of the motor-casing. This pin or shaft 11 is rigid with the rotary member 13, which latter is a worm-wheel, and upon the inner surface of which an eccentric cam 14 is rigidly mounted. The cam-strap 15 of this eccentric device encloses said cam and is provided with rollers 16 and 17 arranged to engage, respectively, the guides 10 and 9, so that when the cam 14 is rotated the strap 15 is held against rotation by the engagement of the roller 16 in the guide 10, the roller sliding up and down in this stationary guide. The motion of the cam-strap 15, however, is such that the roller 17 moves up and down, and slides back and forth in the slot 9 of the oscillatory guide-bar 8, so that the latter has an oscillatory motion to cause a corresponding movement on the part of the bar 6 outside. Thus, the member 13 rotates continually in one direction, and this rotation is converted into an oscillatory or walking-beam movement on the part of the bar 6 in a manner that will be readily understood. Any suitable means, of course, can be employed for rotating the member 13, but to obtain the required operating power, for various purposes, from a high-speed motor of comparatively little power, this member 13 is preferably engaged by a worm 18 on the sleeve 19, and the latter has a worm-pinion 20 which engages the worm 21, the latter being suitably connected with the rotary shaft of the ordinary alternating-current-motor 22, which latter may be of any suitable character. For the purpose shown and described, the supply of current to the motor is preferably controlled by an ordinary snap-switch 23, operated from the shaft 11 through the medium of the spur-gearing 24, so that the motor is automatically stopped as soon as the position of the bar 6 is completely reversed. It will also be understood that the supply of current to the motor is controlled by a thermostat in the room which is to be maintained at a given temperature. The circuits, and the source of current, can be of any suitable, known or approved character.

With this arrangement, the operation is as follows: The damper 1 is connected by a chain or cord 25 with one end of the bar 6, and the check or cold-air-inlet 2, for the smoke-pipe 26, has its movable valve or damper connected by a cord or chain 27 with the other end of said bar, whereby oscillation of this bar in one direction opens the damper 1 and closes the damper 2, while oscillation in the opposite direction will close the damper 2 and open the damper 1, in a manner that will be readily understood. Thus, when the thermostat is operated by a rising temperature, the motor 22 is started and the member 13 is rotated until the bar 6 assumes the position shown in Fig. 1, at which time the snap-switch 23 is then operated to automatically stop the operation of the motor, thus leaving the damper 1 closed and the damper 2 open. On the other hand, when the thermostat is operated by a falling temperature, a circuit of the motor 22 is then closed and the rotation of the member 13 continues until the position of the bar 6 is reversed, as shown in dotted lines in Fig. 1, whereby the damper 1 is automatically opened and the damper 2 is automatically closed, thereby to raise the temperature of the heating system. Suitable pulleys or sheaves, of course, can be provided for supporting the damper chains or cords, in the usual and well-known manner. It will also be understood that while the furnace A is shown as a hot-air furnace, any other kind of furnace—steam or hot water—can be employed, if such is desired, and connected with the regulator B to supply heat to the heating system under thermostatic control. Also, of course, in place of the thermostat which cooperates with the snap-switch 23 to control the supply of current to the motor 22, an ordinary hand-switch can be employed. Fig. 6 shows a diagram of the circuits which may be used, and in this diagram the device C may be either a hand-switch or a thermostat, and may be of any suitable or desired construction.

While the bar 6 is shown as the element to be oscillated, it is obvious that the sleeve 5 can have its outer end shaped or formed to engage any suitable or desired device, so that the latter will be turned first one way and then in the other, at intervals, in the desired manner. With the arrangement shown, the holes 7 afford a means of adjustment of the connections between this bar and the damper chains 25 and 27, so that the length of the opposite end-portions of this bar can practically be changed to suit the requirements of different dampers. It is obvious, however, as stated, that the outer end of the sleeve 5 can be connected in other ways, to various other devices, depending upon the character of the means to be controlled.

What I claim as my invention is:—

1. In combination with the means to be controlled, an oscillatory element for connection to said means, a rotary member adjacent to said means, an eccentric device interposed to convert the rotary motion of said member into oscillatory movement of said element about a fixed axis, and a source of power gear-connected to operate said member, said device comprising a stationary guide, a guide movable with said element, an eccentric strap having means to engage and slide in said guides, and a cam rigid with said member to rotate in said strap.

2. In combination with the means to be controlled, an oscillatory element for connection to said means, a rotary member adjacent to said means, an eccentric device interposed to convert the rotary motion of said member into oscillatory movement of said element about a fixed axis, and a source of power gear-connected to operate said member, and a supporting bracket in which said element is mounted to oscillate, said bracket forming a part of a casing to enclose said member and gear-connection, and said device being disposed between said member and bracket.

3. In combination with the means to be controlled, an oscillatory element for connection to said means, a rotary member adjacent to said means, an eccentric device interposed to convert the rotary motion of said member into oscillatory movement of said element about a fixed axis, and a source of power gear-connected to operate said member, said source of power being a rotary electric motor, and means operated by said motor to automatically stop the rotation of said member after the oscillation of said element in either direction.

Signed by me at Chicago, Illinois, this 20th day of June, 1917.

WILLIAM GEORGE HARTWIG.